United States Patent
Goto et al.

(10) Patent No.: US 9,863,018 B2
(45) Date of Patent: Jan. 9, 2018

(54) ION EXCHANGE RESIN AND METHOD FOR ADSORBING AND SEPARATING METAL

(71) Applicants: Kyushu University, National University Corporation, Fukuoka-shi (JP); SUMITOMO METAL MINING CO., LTD., Tokyo (JP)

(72) Inventors: Masahiro Goto, Fukuoka (JP); Fukiko Kubota, Fukuoka (JP)

(73) Assignees: Kyushu University, National University Corporation, Fukuoka-shi (JP); SUMITOMO METAL MINING CO., LTD., Tokyo (JP)

( * ) Notice: Subject to any disclaimer, the term of this patent is extended or adjusted under 35 U.S.C. 154(b) by 2 days.

(21) Appl. No.: 15/321,286

(22) PCT Filed: Jun. 26, 2015

(86) PCT No.: PCT/JP2015/068520
§ 371 (c)(1),
(2) Date: Dec. 22, 2016

(87) PCT Pub. No.: WO2015/199224
PCT Pub. Date: Dec. 30, 2015

(65) Prior Publication Data
US 2017/0166995 A1    Jun. 15, 2017

(30) Foreign Application Priority Data
Jun. 26, 2014  (JP) .................. 2014-131673

(51) Int. Cl.
C22B 3/08  (2006.01)
C22B 3/42  (2006.01)
(Continued)

(52) U.S. Cl.
CPC ................ *C22B 3/42* (2013.01); *B01J 45/00* (2013.01); *B01J 47/12* (2013.01); *C22B 3/06* (2013.01)

(58) Field of Classification Search
CPC .... C22B 3/42; C22B 3/06; B01J 45/00; B01J 47/12
See application file for complete search history.

(56) References Cited

U.S. PATENT DOCUMENTS 4,639,468 A * 1/1987 Roncucci .............. C07C 255/00
                                                       514/478
5,900,144 A    5/1999 Mano et al.
(Continued)

FOREIGN PATENT DOCUMENTS

AU    725800 B2    10/2000
CA    2827635 A1 *  5/2013
(Continued)

OTHER PUBLICATIONS

Inpadoc patent family list from Espacenet published May 2013.*
(Continued)

*Primary Examiner* — George Wyszomierski
*Assistant Examiner* — Tima M McGuthry Banks
(74) *Attorney, Agent, or Firm* — Locke Lord LLP

(57) ABSTRACT

Provided is a system for efficiently recovering trace metal from a large amount of a raw material, such as when trace metal is recovered from nickel oxide ore. This ion exchange resin has, on a carrier, an amide derivative represented by the following general formula. In the formula, R1 and R2 represent the same or different alkyl groups, R3 represents a hydrogen atom or an alkyl group, and R4 represents a hydrogen atom or an arbitrary group, other than an amino group, bonded to α carbon as an amino acid. The amide derivative is preferably a glycinamide derivative. The carrier (Continued)

preferably includes a primary amine and/or a secondary amine.

4 Claims, 2 Drawing Sheets

(51) Int. Cl.
*B01J 45/00* (2006.01)
*B01J 47/12* (2017.01)
*C22B 3/06* (2006.01)

(56) References Cited

U.S. PATENT DOCUMENTS

| | | | |
|---|---|---|---|
| 7,416,712 B2 * | 8/2008 | Beckmann | C22B 1/06 423/150.1 |
| 2014/0234187 A1 | 8/2014 | Goto et al. | |
| 2014/0377150 A1 | 12/2014 | Goto et al. | |
| 2015/0284821 A1 | 10/2015 | Takano et al. | |
| 2015/0315674 A1 | 11/2015 | Goto et al. | |
| 2016/0010177 A1 | 1/2016 | Goto et al. | |
| 2016/0010178 A1 * | 1/2016 | Ogata | C08G 73/0206 423/21.1 |

FOREIGN PATENT DOCUMENTS

| | | |
|---|---|---|
| CN | 101785991 A | 7/2010 |
| CN | 103055819 A | 4/2013 |
| EP | 2712940 A1 | 4/2014 |
| JP | 05-097715 A | 4/1993 |
| JP | 06-080594 A | 3/1994 |
| JP | 07-100371 A | 4/1995 |
| JP | 2000-234130 A | 8/2000 |
| JP | 2004-233278 A | 8/2004 |
| JP | 2007327085 A | 12/2007 |
| JP | 2013-189675 A | 9/2013 |
| JP | 2013-216966 A | 10/2013 |
| WO | 2014/091805 A1 | 6/2014 |
| WO | 2014/148431 A1 | 9/2014 |
| WO | 2014/157225 A1 | 10/2014 |
| WO | 2015/025558 A1 | 2/2015 |

OTHER PUBLICATIONS

Kojiro Shimojo et al., "Extraction Behavior and Separation of Lanthanides with a Diglycol Amic Acid Derivative and a Nitrogen-donor Ligand," Analytical Sciences, vol. 23, Dec. 2007, pp. 1427-1430.

K. Shimojo et al., "Extraction behavior and separation of lanthanides with a diglycol amic acid derivative and a nitrogen-donor ligand," Anal. Sci., Dec. 23, 2007, pp. 1427-1430. (discussed in the spec).

Office Action issued to JP Application No. 2014-131673, dated Aug. 30, 2016 and English translation thereof.

International Search Report dated Sep. 29, 2015, issued for PCT/JP2015/068520.

Yuzo Baba et al.: "Development of Novel Extractants with Amino Acid Structure for Efficient Separation of Nickel and Cobalt from Manganese Ions," Industrial & Engineering Chemistry Research, vol. 53, No. 2, Jan. 15, 2014, pp. 812-818, XP055142933. (cited in the May 16, 2017 EP Search Report).

Xin Li et al., "Environmental-Friendly Process for Recovering Copper and Nickel from Jinchuan Tailings by Silica-Based Selective Adsorbents," Industrial & Engineering Chemistry Research., vol. 53, No. 27, Jun. 11, 2014, pp. 11137-11144, XP055368825. (cited in the May 16, 2017 EP Search Report).

Extended European Search Report dated May 16, 2017, issued to EP Application No. 15810881.1.

\* cited by examiner

RELATIONSHIP BETWEEN pH OF POST-EXTRACTION LIQUID AND ADSORPTION RATE
ON RESIN WHEN USING ION EXCHANGE RESIN ACCORDING TO EXAMPLE 1

RELATIONSHIP BETWEEN pH OF POST-EXTRACTION LIQUID AND ADSORPTION RATE ON RESIN WHEN USING ION EXCHANGE RESIN ACCORDING TO EXAMPLE 2

ION EXCHANGE RESIN AND METHOD FOR ADSORBING AND SEPARATING METAL

TECHNICAL FIELD

The present invention relates to an ion exchange resin and a method for adsorbing and separating a metal.

BACKGROUND ART

Cobalt and rare earth metals are known as valuable metals, and have various uses in industry. Cobalt is used, for example, in positive electrode materials for secondary batteries, and further for superalloys (high strength heat resistant alloys), which are used in jet engines of aircraft, for example. Rare earth metals are used in phosphor materials, negative electrode materials for nickel-hydrogen batteries, additives for magnets built into motors, abrasives for glass substrates used for liquid crystal panels and hard drives, and the like.

In recent years, energy conservation has been strongly promoted, and the changeover from conventional gasoline-fueled cars to hybrid cars and electric cars with a secondary battery using cobalt and rare earth metals is being rapidly made in the automotive industry. Also, the changeover from conventional fluorescent tubes to efficient three-wavelength fluorescent tubes using rare earth metals such as lanthanum, cerium, yttrium, terbium and europium is being rapidly made in lighting equipment. The above cobalt and rare earth metals are scarce resources, and most of them are obtained via imports.

However, yttrium and europium are used in the phosphors in CRT-televisions for analog broadcasting, and a large number of cathode-ray tubes have been discarded as used products with the changeover to liquid crystal television in recent years. It can be easily expected that products such as secondary batteries and three-wavelength fluorescent tubes, which have rapidly spread, will also represent a large amount of waste in the future as used products. As described above, it is not preferred that cobalt and rare earth metals, scarce resources, not be recycled from used products and be treated as waste from the viewpoint of resource conservation and resource security. The establishment of a method for effectively recovering valuable metals such as cobalt and rare earth metals from such used product has been strongly demanded recently.

<Recovery of Cobalt from Secondary Battery>

Examples of the above secondary batteries include nickel-hydrogen batteries and lithium-ion batteries and the like, and cobalt and further manganese, rare metals, are used in the positive electrode materials therefor. In positive electrode materials for lithium-ion batteries, the percentage of low-priced manganese tends to be raised in the place of high-priced cobalt. Recently, the recovery of valuable metals from used batteries has been attempted, and one recovery method is a dry method in which used batteries are put into a furnace and dissolved to separate into metals and slag and the metals are recovered. In this method, however, manganese moves to the slag, and thus only cobalt is recovered.

In addition, a wet method in which used batteries are dissolved in an acid and metals are recovered using a separation method such as a precipitation method, a solvent extraction method or an electrowinning method, is also known. In the precipitation method, for example, a method in which the pH of a solution containing cobalt and manganese is adjusted and a sulfurizing agent is added thereto to obtain precipitates of sulfurized cobalt, and a method in which an oxidizing agent is added to obtain precipitates of oxidized manganese are known (e.g., see Patent Document 1). In this method, however, there are problems in that, for example, coprecipitation occurs, and it is difficult to completely separate cobalt and manganese.

When attempts are made to recover cobalt as a metal by the electrowinning method, it is known that manganese oxides are precipitated on the surface of the anode in a system in which a high concentration of manganese exists, and the deterioration of the anode is promoted. In addition, fine manganese oxides with a specific color float in an electrolytic solution, which, for example, causes clogging of the filter cloth used in electrowinning and the contamination of the cobalt metal with the manganese oxides, and thus stable operations are difficult.

Acid extractant is widely used when attempting to recover cobalt using the solvent extraction method. As described above, however, because a large amount of manganese is used in positive electrode materials for lithium-ion batteries recently, a high concentration of manganese exists in the solution of batteries. There are no effective extractants to selectively and effectively extract cobalt from such a system.

A nickel ore, such as nickel oxide ore is used as a raw material in the recycling of used batteries and further cobalt smelting. The ratio of manganese is higher than that of cobalt in nickel oxide ore, and the existing ratio thereof is about 5 to 10 times that of cobalt, and separation from manganese is a large problem in cobalt smelting.

<Recovery of Rare Earth Metal from Three-Wavelength Fluorescent Tubes and Cathode-Ray Tubes>

A mixture of rare earth metals such as lanthanum, cerium, yttrium, terbium and europium is used in the phosphors used in the three-wavelength fluorescent tubes mentioned above. Furthermore, yttrium and europium together with a high ratio of zinc are contained and used in phosphors for cathode-ray tubes.

As a method for recovering a specific rare earth metal from a mixture of rare earth metals, a method for recovering the specific rare earth metal from a liquid, in which the rare earth metals are dissolved in an acid such as mineral acid, by the solvent extraction method is generally used. An industrial example using the trade name PC88A (manufactured by DAIHACHI CHEMICAL INDUSTRY CO., LTD.), a phosphorus-based extractant exists for the mutual separation of rare earth metals, for example. However, because this extractant contains phosphorus in the structure, an advanced wastewater treatment system is required to prevent the extractant and deteriorated materials thereof in discharged water polluting public water areas when industrially using the extractant. The extractant is subject to total volume control in accordance with the Water Pollution Law on specific areas in Japan, and thus there are concerns when using the extractant on an industrial scale.

As a phosphorus-free extractant, a carboxylic acid-based extractant (e.g., 2-methyl-2-ethyl-1-heptanoic acid: neodecanoic acid) is put to practical use. However, this extractant acts in extraction only in a high pH range, neutral or higher, and thus when an acid solution as described above is used, a large amount of neutralizer is required, and so cost increases are a concern. Furthermore, the extraction ability of the carboxylic acid-based extractant is lower than that of the phosphorus-based extractant described above, and excessive equipment is required, and thus there is also a problem of cost increases.

To solve such problems, an extractant called DODGAA having the skeleton of diglycol amic acid is developed (e.g., see Patent Document 2). However, when this extractant is used, as shown in Non-Patent Document 1, yttrium (Y), lutetium (Lu), ytterbium (Yb), thulium (Tm), erbium (Er), and holmium (Ho), called heavy rare earth metals among rare earth metals, have a strong tendency to be extracted with dysprosium (Dy), terbium (Tb), gadolinium (Gd), europium (Eu), and samarium (Sm) called middle rare earth metals, and thus the extractant is not suitable for mutual separation of rare earth metals. In the case of DODGAA, the extraction rate of promethium (Pm), neodymium (Nd), praseodymium (Pr), cerium (Ce), and lanthanum (La), called light rare earth metals, is also low. Europium (Eu), which is produced in especially small amounts and expensive, cannot be selectively recovered from other rare earth metals. As described above, an extractant by which the mutual separation of rare earth metals is possible, and further an extractant which can efficiently extract light rare earth metals have not yet been found.

To solve the problems, it is suggested that light rare earths, which have been difficult to separate in Patent Document 2 mentioned above, are efficiently separated using a specific amide derivative (e.g., see Patent Documents 3 and 4). When this amide derivative is used, outstanding characteristics, which conventional extractants do not have, are obtained, for example a small amount of cobalt can be extracted from a high concentration of manganese. Furthermore, the above amide derivative also has a feature to be able to specifically extract scandium among rare earth elements, and scandium is known to exhibit behaviors different from those of other rare earth elements. The amide derivative is thus suitable, for example, for recovering a small amount of scandium contained in nickel oxide ore from a solution obtained by acid leaching of the nickel oxide ore.

Patent Document 1: Japanese Unexamined Patent Application, Publication No. 2000-234130
Patent Document 2: Japanese Unexamined Patent Application, Publication No. 2007-327085
Patent Document 3: Japanese Unexamined Patent Application, Publication No. 2013-216966
Patent Document 4: Japanese Unexamined Patent Application, Publication No. 2013-189675
Non-Patent Document 1: K. Shimojo, H. Naganawa, J. Noro, F. Kubota and M. Goto; Extraction behavior and separation of lanthanides with a diglycol amic acid derivative and a nitrogen-donor ligand; Anal. Sci., 23, 1427-30, 2007 December.

For example, in the case of the above acid solution obtained by acid leaching of nickel oxide ore, the concentration of scandium contained in the acid solution is about several to several tens mg/l, which is extremely low. When the above amide derivative is used for solvent extraction treatment, because the concentration of scandium contained in the acid solution is extremely low, a large amount of extractant is required for the solvent extraction treatment. Furthermore, due to the large amount of extractant, the equipment sizes, extraction tank and liquid storage tank for example, are also expanded on a similar scale, and thus the increase in spending on the equipment necessary becomes a problem.

In general, in the case of the solvent extraction treatment, when the conditions such as the mixing ratio of extractant and acid solution and liquid temperature are not constantly maintained, extraction characteristics are changed, and stable operations tend to be difficult to accomplish. Therefore, detailed operation control is required. In addition, when air is caught during extraction operation, inclusion called CRUD is produced by oxidization of iron ions contained in the solution, and this involves solvent extraction operations being inhibited. In particular, a high concentration, several g/l or more, of divalent iron ion is contained in the above acid solution obtained by acid leaching of nickel oxide ore in many cases, and thus it is preferred that the acid solution be used for a solvent extraction step after the concentration of divalent iron ions contained therein is kept as low as possible.

As described above, it is required that a large amount of raw material be treated and detailed operation control be carried out in this treatment, when, for example, recovering a trace metal from nickel oxide ore.

DISCLOSURE OF THE INVENTION

Problems to be Solved by the Invention

An object of the present invention is to provide a system to efficiently recover a trace metal from a large amount of raw material, for example when a trace metal is recovered from nickel oxide ore.

As a result of repeated diligent investigations to solve the above problems, the present inventors found that the above object could be achieved by adsorbing a metal contained in an acid leaching solution of a raw material on a resin having an amide derivative represented by the following general formula (I) on a carrier and recovering the metal adsorbed on the resin, thereby completing the present invention.

Means for Solving the Problems

Specifically, the present invention provides the following.
(1) The present invention is an ion exchange resin having, on a carrier, an amide derivative represented by the following general formula (I):

[Chem. 1]

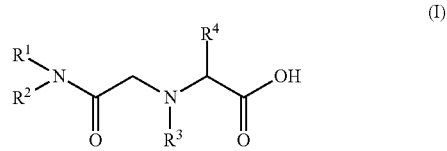

(wherein, R1 and R2 each represent the same or different alkyl groups,
the alkyl group may be a straight chain or a branched chain,
R3 represents a hydrogen atom or an alkyl group, and
R4 represents a hydrogen atom or an arbitrary group other than an amino group bonded to α carbon as an amino acid.)
(2) The present invention is also the ion exchange resin according to (1), wherein the amide derivative is a glycinamide derivative.
(3) The present invention is also the ion exchange resin according to (1) or (2), wherein the carrier includes a primary amine and/or a secondary amine.
(4) The present invention is also a method for adsorbing and separating a metal, the method comprising adsorbing one or more metals selected from cobalt, nickel, scandium and rare earth elements on a resin according to any of (1) to (3), and recovering the metal adsorbed on the resin.
(5) The present invention is also a method for adsorbing and separating a metal, the method comprising adsorbing a metal contained in an acid leaching solution obtained by high pressure acid leaching of nickel oxide ore on a resin according to any of (1) to (3), and recovering the metal adsorbed on the resin.

Effects of the Invention

According to the present invention, a system can be provided to efficiently recover a trace metal from a large amount of raw material, for example when a trace metal is recovered from nickel oxide ore.

PREFERRED MODE FOR CARRYING OUT THE INVENTION

Figure 1:
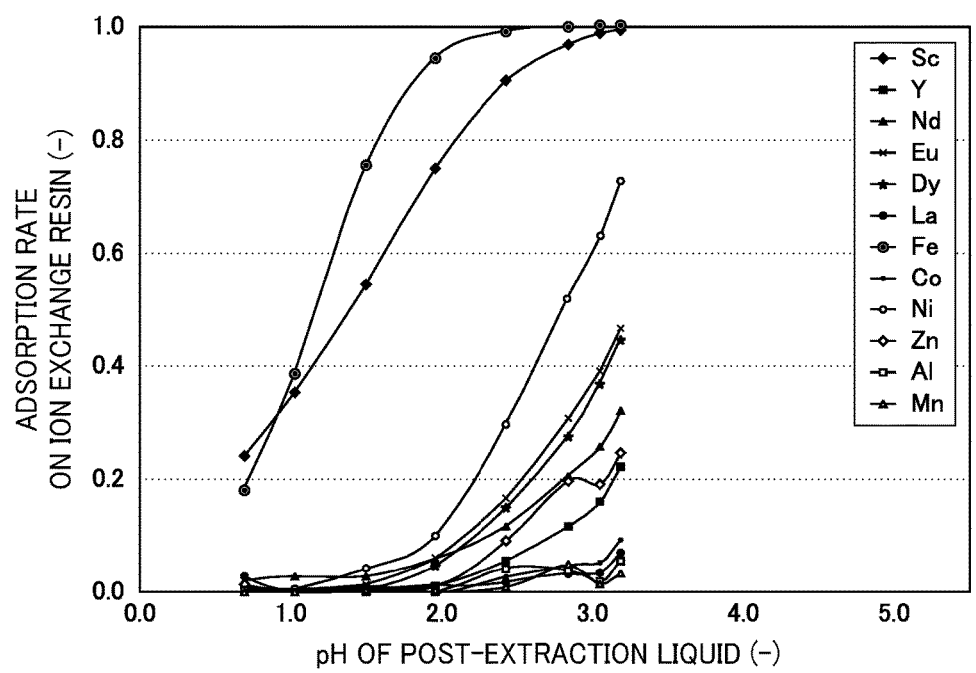
FIG. 1 is a graph showing the relationship between the pH of the post-extraction liquid and the adsorption rate on the resin when using the ion exchange resin according to Example 1.

The specific embodiments of the present invention will now be described in detail. It should be noted however that the present invention is not limited to the following embodiments, and can be carried out with modifications within the scope of the object of the present invention.
<Ion Exchange Resin>
The ion exchange resin of the present invention has, on a carrier, an amide derivative represented by the following general formula (I). In the present invention, lipophilicity is increased by introducing an alkyl group into the skeleton of amide, and it can be used as a functional group when adsorbing one or more metals selected from cobalt, nickel, scandium and other rare earth elements.

[Chem. 2]

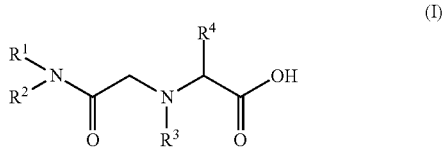

(I)

As long as the ion exchange resin can suitably adsorb a trace metal (one or more trace metals selected from cobalt, nickel, scandium and other rare earth elements) contained in an acid leaching solution of, for example, nickel oxide ore, and the metal adsorbed on the resin can be suitably recovered by later treatment, the type of ion exchange resin is not particularly limited.

Solid extractants such as ion exchange resins have advantages including physically stable handling being possible, it being possible to carry out operations using simple equipment, and separation can be comparatively stably carried out even when operating conditions change. In addition, the reaction by ion exchange does not have many physical movements, for example mixing an extractant and a solution in the solvent extraction method, and the contact of the ion exchange resin and the solution is generally carried out in a sealed column in many cases. Therefore, there are also features in which catching e.g. air is prevented, the production of CRUD is thus suppressed, and operations are stably carried out.
[Amide Derivative]
In the formula, substituents R1 and R2 each represent the same or different alkyl groups. In R1 and R2, the alkyl group may be a straight chain or a branched chain. In R1 and R2, the number of carbons in an alkyl group is not particularly limited, and is preferably 5 or more and 11 or less.
R3 represents a hydrogen atom or an alkyl group. R4 represents a hydrogen atom or an arbitrary group other than an amino group bonded to α carbon as an amino acid.
As long as the amide derivative can adsorb one or more metals selected from cobalt, nickel, scandium and other rare earth elements, the type of the above amide derivative is not particularly limited, and the amide derivative is preferably a glycinamide derivative from the viewpoint that the derivative can be easily produced. When the amide derivative is a glycinamide derivative, the above glycinamide derivative can be synthesized by the following method. First, a 2-halogenated acetyl halide is added to an alkylamine having a structure represented by NHR1R2 (R1 and R2 are the same as the above substituents R1 and R2), and the hydrogen atom of amine is substituted with 2-halogenated acetyl by the nucleophilic substitution reaction to obtain 2-halogenated (N,N-di)alkylacetamide.
Next, the above 2-halogenated(N,N-di)alkylacetamide is added to a glycine or N-alkylglycine derivative, and one of the hydrogen atoms of the glycine or N-alkylglycine derivative is substituted with an (N,N-di)alkylacetamide group by the nucleophilic substitution reaction. A glycine alkylamide derivative can be synthesized by the two-step reaction.
A histidinamide derivative, a lysinamide derivative or an aspartic acid amide derivative can be synthesized by substituting glycine with histidine, lysine or aspartic acid.
The extraction behaviors of a glycine alkylamide derivative, a histidinamide derivative, a lysinamide derivative, and an aspartic acid amide derivative are thought to be within the scope of the results obtained by using a glycine derivative from the stability constants of complexes of manganese, cobalt and the like, which are subjects.
[Carrier]
As long as the carrier is a solid material which can bond the above amide derivative, is chemically stable with the acid solution which is adsorbed, not physically affected when put into a column and a solution, and not deteriorated during adsorption operations, the carrier is not particularly limited. From the viewpoint of chemical stability, for example, the carrier preferably includes a primary amine and/or a secondary amine. The carrier more preferably includes a primary amine particularly to be able to selectively adsorb a trace metal which is a subject.
Specific examples of carriers include 3-aminopropyl silica gel, 3-(ethylenediamino)propyl silica gel, and the like.
<Adsorption of Valuable Metals on Resin>
The techniques for adsorbing a valuable metal ion using e.g. the above ion exchange resin include a method called a batch method or a resin-in-pulp method, in which while adjusting the acid solution containing the target valuable metal ion, this acid solution is brought into contact with the above ion exchange resin etc., and further a column method in which the above ion exchange resin etc. is filled in a column and the above acid solution is applied to this column to come into contact therewith, and the like. Using these techniques, a target valuable metal ion can be selectively adsorbed on the substituents R1 and R2 of the above ion exchange resin, etc.

[Adsorption of Cobalt]

When efficiently adsorbing cobalt from an acid solution containing cobalt and manganese, the pH of the acid solution is preferably 3.5 or higher and 5.5 or lower, and more preferably 4.0 or higher and 5.0 or lower. When the pH is lower than 3.5, there is a possibility that cobalt cannot be sufficiently adsorbed. When the pH is above 5.5, there is a possibility that not only cobalt but also manganese is adsorbed.

[Adsorption of Scandium]

When adsorbing scandium from an acid solution containing scandium, the pH of the acid solution is preferably 0.5 or higher and 2.5 or lower, more preferably 1.0 or higher and 2.0 or lower, and even more preferably 1.5 or higher and 2.0 or lower. When the pH is lower than 0.5, there is a possibility that scandium cannot be sufficiently adsorbed. In a case when the acid solution is an acid solution obtained by acid leaching of nickel oxide ore, for example, when the pH is above 2.5, there is a possibility that not only scandium but also aluminum, zinc, nickel, cobalt and the like contained in the acid solution are adsorbed, and thus the amount of work involved may increase, for example purification is required in the following step.

[Adsorption of Europium]

When adsorbing europium from an acid aqueous solution containing several types of rare earth metal such as europium and yttrium, and zinc, the pH of the acid solution is preferably 2.0 or higher and 3.0 or lower. When the pH is lower than 2.0, there is a possibility that europium cannot be sufficiently extracted. When the pH is above 3.0, there is a possibility that not only europium but also other rare earth metals including yttrium are adsorbed.

[Adsorption of Rare Earth Elements (Light Rare Earth Elements)]

The ion exchange resin of the present invention etc. has a feature in that light rare earth elements and middle rare earth elements are more easily adsorbed than heavy rare earth elements. Because of this, particularly while adjusting the pH of a solution containing both heavy rare earth elements and light rare earth elements, the solution is allowed to come into contact with the ion exchange resin of the present invention, thereby being able to selectively adsorb light rare earth elements from the solution. As a result, light rare earth elements and heavy rare earth elements can be separated. In addition, when a solution further contains middle rare earth elements, an eluent recovered from the above ion exchange resin etc. by a technique described in <Recovery of Valuable Metals from Resin> mentioned below is used for solvent extraction, for example using an organic solvent containing an amide derivative represented by the above general formula (I), thereby being able to suitably separate light rare earth elements and middle rare earth elements.

When adsorbing light rare earth elements from an acid solution containing heavy rare earth elements and light rare earth elements, the pH of the acid solution is preferably 1.7 or higher and 2.7 or lower. When the pH is lower than 1.7, there is a possibility that light rare earth elements cannot be sufficiently adsorbed. When the pH is above 2.7, there is a possibility that not only light rare earth elements but also heavy rare earth elements are adsorbed.

The mechanism via which the resin of the present invention exhibits behaviors of adsorption or extraction different from those of conventional ion exchange resins etc. and extractants for solvent extraction is unclear; however, it is thought that the effects which have not been conventionally obtained are displayed due to the structural features of the ion exchange resin of the present invention.

<Recovery of Valuable Metals from Resin>

With respect to an ion exchange resin after adsorption of a valuable metal ion, the ion exchange resin is washed with e.g. pure water to remove a part of the above acid solution attached to the surface, and an eluent adjusted to a pH lower than that of the above acid aqueous solution is then applied thereto as known in conventionally known methods, thereby being able to recover a target valuable metal ion from the ion exchange resin.

The eluent is not particularly limited as long as the pH thereof is adjusted to be lower than that of the above acid aqueous solution, and examples thereof include an aqueous solution in which nitric acid, hydrochloric acid, or sulfuric acid is diluted, and the like. In addition, a target valuable metal ion can be concentrated by appropriately changing the contact time of the ion exchange resin and the eluent, i.e. the time the eluent is in the column, and the like.

Since the equilibrium arrival time varies depending on the types and concentration of valuable metal, the eluent flow rate and eluent temperature can be appropriately set depending on an acid aqueous solution of valuable metal ions and conditions. The pH of an acid aqueous solution containing a metal ion can be also appropriately adjusted depending on the types of valuable metal.

EXAMPLES

The present invention will now be described in more detail by way of examples thereof. It should be noted however that the present invention is not limited to these descriptions.

Preparation of Ion Exchange Resin Having Amide Derivative

Example 1

As an example of amide derivatives forming an ion exchange resin according to the present invention, N—[N,N-bis(2-ethylhexyl)aminocarbonylmethyl]glycine (or also referred to as N,N-di(2-ethylhexyl)acetamide-2-glycine, and hereinafter referred to as "D2EHAG") into which two 2-ethylhexyl groups were introduced was used. The chemical formula of D2EHAG is described in Patent Document 3 mentioned above.

An ion exchange resin having D2EHAG was prepared as follows.

(1) 4.37 g of chloroacetyl chloride (corresponding to 3 equivalents with respect to the amine of silica gel which is supported) and 1.32 g of triethylamine (TEA) were collected, and these were dissolved by adding 70 ml of dichloromethane (DCM).

(2) 10 g of 3-aminopropyl silica gel was added to the solution obtained in (1), and the obtained mixture was stirred for a day while maintaining room temperature.

(3) After stirring, the product was filtered, and washed by adding methanol.

(4) After washing, the product was dried to obtain about 10 g of pale yellow intermediate silica gel. The recovery rate calculated from the amount of substance was about 92%.

(5) 70 ml of methanol solution is added to 5.85 g of glycine (corresponding to 6 equivalents with respect to the amine of silica gel similarly to the above) and 3.15 g of sodium hydroxide, and the obtained mixture is mixed, and gradually added to 8 g of the intermediate silica gel mentioned in (4) above.

(6) The obtained mixture is allowed to react over 15 hours while maintaining 60° C.

(7) The obtained reaction product is washed by successively adding ethyl acetate, methanol, acetone and water, and then dried.

(8) By undergoing (1) to (7) above, 7.94 g of product (glycine acetaminopropyl silica gel) was obtained. This product is used as the ion exchange resin according to Example 1. The recovery rate of the product was about 96%.

Example 2

The ion exchange resin according to Example 2 (glycine aceto(ethylenediamino)propyl silica gel) was obtained in the same manner as in Example 1 except that 3-aminopropyl silica gel was changed to 3-(ethylenediamino)propyl silica gel.

A glycinamide derivative and further a normal-methyl-glycine derivative, a histidinamide derivative and the like are also known as an amide derivative, and these can be also supported as a functional group on a carrier to make an ion exchange resin as in the case with the above glycinamide derivative.

<Evaluation>

Eight types of acid solution were prepared, which each contained scandium (Sc), yttrium (Y), neodymium (Nd), europium (Eu), dysprosium (Dy), lanthanum (La), iron (Fe), cobalt (Co), nickel (Ni), zinc (Zn), aluminum (Al) and manganese (Mn) at 1×10-4 mol/l and were adjusted to pH 0.7, 1.0, 1.5, 2.0, 2.5, 3.0, 3.3 and 3.7. The pH was adjusted using sulfuric acid, ammonium sulfate and ammonia with a concentration of 0.2 mol/l.

Next, with respect to the ion exchange resin according to Example 1, 50 ml of the above acid solution and 0.5 dry-g of the ion exchange resin according to Example 1 were put into a beaker, and the obtained mixture was maintained at 25° C. and stirred using a stirrer for an hour. With respect to the ion exchange resin according to Example 2, 50 ml of the above acid solution and 0.3 dry-g of the ion exchange resin according to Example 2 were put into a beaker, and the obtained mixture was maintained at 25° C. and stirred using a stirrer for an hour.

Figure 2:
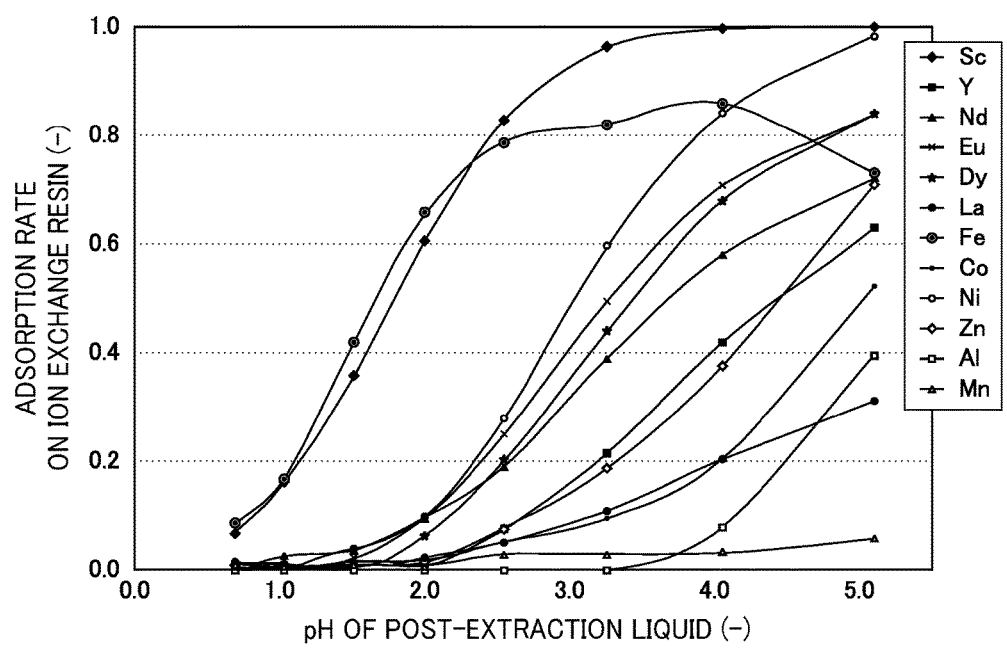
FIG. 2 is a graph showing the relationship between the pH of the post-extraction liquid and the adsorption rate on the resin when using the ion exchange resin according to Example 2.

After stirring for an hour, the ion exchange resin and a post-adsorption liquid were obtained by solid-liquid separation using filter paper, and the pH of the post-adsorption liquid was measured. Next, the ion exchange resin was washed by a water pouring treatment using a small amount of pure water, and the post-adsorption liquid and washing water were combined to obtain a new post-adsorption liquid. The volume thereof was measured, and the concentration of the components, which were contained in the starting liquid, in the post-adsorption liquid was measured using an inductively coupled plasma atomic emission spectrometer (ICP-AES). From the measurement results, the adsorption rate (distribution) on the ion exchange resins was defined from changes in the amount of substance in an acid solution before and after adsorption using (1−Amount of Substance after Adsorption/Amount of Substance before Adsorption), and found. The results for Example 1 are shown in Table 1 and FIG. 1, and the results for Example 2 are shown in Table 2 and FIG. 2. In FIGS. 1 and 2, the pH of an acid solution is the abscissa, and the extraction rate (Unit: -) of metal elements is the ordinate.

TABLE 1

Modified 3-aminopropyl silica gel (D2EHAG)

| A: 0.5 g/50 ml | | 0.2M SO4 (H2SO4—(NH4)2SO4) | | | | | | | | | | |
|---|---|---|---|---|---|---|---|---|---|---|---|---|
| pH (before) | pH (after) | Sc | Y | Nd | Eu | Dy | La | Fe | Co | Ni | Zn | Al | Mn |
| 0.7 | 0.7 | 0.24 | 0.01 | 0.02 | 0.01 | 0.00 | 0.03 | 0.18 | 0.00 | 0.01 | 0.02 | 0.00 | 0.00 |
| 1.0 | 1.0 | 0.35 | 0.00 | 0.03 | 0.01 | 0.00 | 0.00 | 0.39 | 0.00 | 0.01 | 0.00 | 0.00 | 0.00 |
| 1.5 | 1.5 | 0.55 | 0.00 | 0.03 | 0.02 | 0.01 | 0.01 | 0.76 | 0.01 | 0.04 | 0.01 | 0.00 | 0.00 |
| 2.0 | 2.0 | 0.75 | 0.01 | 0.06 | 0.06 | 0.05 | 0.01 | 0.95 | 0.00 | 0.10 | 0.01 | 0.00 | 0.00 |
| 2.5 | 2.4 | 0.90 | 0.06 | 0.12 | 0.17 | 0.15 | 0.02 | 0.99 | 0.03 | 0.30 | 0.09 | 0.04 | 0.01 |
| 3.0 | 2.8 | 0.97 | 0.12 | 0.21 | 0.31 | 0.28 | 0.03 | 1.00 | 0.05 | 0.52 | 0.20 | 0.04 | 0.05 |
| 3.3 | 3.1 | 0.99 | 0.16 | 0.26 | 0.39 | 0.38 | 0.04 | 1.00 | 0.06 | 0.63 | 0.19 | 0.02 | 0.02 |
| 3.7 | 3.2 | 1.00 | 0.23 | 0.32 | 0.47 | 0.45 | 0.07 | 1.00 | 0.10 | 0.73 | 0.25 | 0.06 | 0.03 |

TABLE 2

Modified 3-(ethylenediamino)propyl silica gel (D2EHAG)

| B: 0.3 g/50 ml | | 0.2M SO4 (H2SO4—(NH4)2SO4) | | | | | | | | | | |
|---|---|---|---|---|---|---|---|---|---|---|---|---|
| pH (before) | pH (after) | Sc | Y | Nd | Eu | Dy | La | Fe | Co | Ni | Zn | Al | Mn |
| 0.7 | 0.7 | 0.07 | 0.00 | 0.00 | 0.00 | 0.00 | 0.01 | 0.08 | 0.02 | 0.01 | 0.01 | 0.00 | 0.01 |
| 1.0 | 1.0 | 0.16 | 0.00 | 0.03 | 0.00 | 0.00 | 0.01 | 0.17 | 0.00 | 0.01 | 0.00 | 0.00 | 0.00 |
| 1.5 | 1.5 | 0.36 | 0.00 | 0.04 | 0.02 | 0.00 | 0.00 | 0.42 | 0.02 | 0.04 | 0.01 | 0.00 | 0.01 |
| 2.0 | 2.0 | 0.60 | 0.01 | 0.10 | 0.09 | 0.06 | 0.02 | 0.65 | 0.02 | 0.10 | 0.01 | 0.00 | 0.01 |
| 2.5 | 2.6 | 0.83 | 0.07 | 0.19 | 0.25 | 0.20 | 0.05 | 0.79 | 0.05 | 0.28 | 0.08 | 0.00 | 0.03 |
| 3.0 | 3.3 | 0.96 | 0.21 | 0.39 | 0.50 | 0.44 | 0.11 | 0.82 | 0.10 | 0.60 | 0.19 | 0.00 | 0.03 |
| 3.3 | 4.0 | 1.00 | 0.42 | 0.58 | 0.71 | 0.68 | 0.20 | 0.86 | 0.20 | 0.84 | 0.38 | 0.08 | 0.03 |
| 3.7 | 5.1 | 1.00 | 0.63 | 0.72 | 0.84 | 0.84 | 0.31 | 0.73 | 0.52 | 0.98 | 0.71 | 0.40 | 0.06 |

From Tables 1 and 2 and FIGS. 1 and 2, it was verified that, when the ion exchange resins in Examples were used, one or more metals selected from cobalt, nickel, scandium and rare earth elements could be selectively adsorbed by suitably adjusting the pH of an acid solution. From the results, it can be also said that a metal (one or more metals selected from cobalt, nickel, scandium and rare earth elements) contained in an acid leaching solution obtained by high pressure acid leaching of nickel oxide ore can be selectively adsorbed.

The invention claimed is:

1. A method for adsorbing and separating a metal, the method comprising:

applying an acid solution containing one or more metals selected from cobalt, nickel, scandium and rare earth elements to an ion exchange resin to adsorb the metal on the ion exchange resin, and recovering the metal adsorbed on the ion exchange resin, wherein the ion exchange resin has an amide derivative represented by the following general formula (I) on a carrier, and the carrier includes 3-aminopropyl silica gel and/or 3-(ethylenediamino)propyl silica gel:

[Chem. 1]

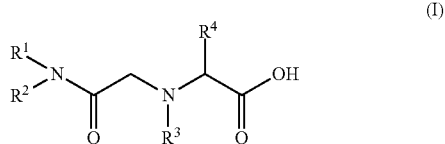

(I)

(wherein, $R^1$ and $R^2$ each represent the same or different alkyl groups, the alkyl group is optionally a straight chain or a branched chain, $R^3$ represents a hydrogen atom or an alkyl group, and $R^4$ represents a hydrogen atom or an arbitrary group other than an amino group bonded to α carbon as an amino acid).

2. The method for adsorbing and separating a metal according to claim 1, wherein the amide derivative is a glycinamide derivative.

3. The method for adsorbing and separating a metal according to claim 2, the method comprising adsorbing a metal contained in an acid leaching solution obtained by high pressure acid leaching of nickel oxide ore on the ion exchange resin and recovering the metal adsorbed on the ion exchange resin.

4. The method for adsorbing and separating a metal according to claim 1, the method comprising adsorbing a metal contained in an acid leaching solution obtained by high pressure acid leaching of nickel oxide ore on the ion exchange resin and recovering the metal adsorbed on the ion exchange resin.

* * * * *